United States Patent
Penichon

(10) Patent No.: US 7,544,895 B2
(45) Date of Patent: Jun. 9, 2009

(54) FISHPLATE AND A WIRE DUCT TRAY COMPRISING AT LEAST TWO SEGMENTS INTERCONNECTED BY SUCH A FISHPLATE

(75) Inventor: Mickaël Penichon, Saint-Calais (FR)

(73) Assignee: Societe de Constructions Electriques de la Seine (CES), Issy les Moulineaux (FR)

( * ) Notice: Subject to any disclaimer, the term of this patent is extended or adjusted under 35 U.S.C. 154(b) by 0 days.

(21) Appl. No.: 11/123,926

(22) Filed: May 6, 2005

(65) Prior Publication Data

US 2006/0249300 A1 Nov. 9, 2006

(51) Int. Cl.
*H01B 7/00* (2006.01)
(52) U.S. Cl. .............. 174/135; 174/480; 174/68.1; 439/309; 439/326; 211/181.1; 24/295
(58) Field of Classification Search .............. 403/309, 403/326, 303, 311, 286; 174/135, 480, 481, 174/68.1, 68.3; 211/119, 26, 181.1; 24/295, 24/263, 563
See application file for complete search history.

(56) References Cited

U.S. PATENT DOCUMENTS

| | | | |
|---|---|---|---|
| 3,791,749 A | 2/1974 | Grille et al. | |
| 4,140,417 A | 2/1979 | Danielsen et al. | |
| 5,384,937 A | 1/1995 | Simon | |
| 6,061,884 A * | 5/2000 | Ohms et al. | 24/703.1 |
| 6,193,434 B1 | 2/2001 | Durin et al. | |
| 6,402,418 B1 * | 6/2002 | Durin et al. | 403/329 |
| 6,590,154 B1 * | 7/2003 | Badey et al. | 174/480 |
| 6,855,884 B2 * | 2/2005 | Spagnoli et al. | 211/181.1 |
| 7,468,491 B2 * | 12/2008 | Deciry et al. | 174/135 |
| 2001/0044992 A1 | 11/2001 | Jahrling | |

FOREIGN PATENT DOCUMENTS

DE 44 46 229 A1 8/1995
EP 0 822 364 B1 5/2001

* cited by examiner

*Primary Examiner*—Angel R Estrada
(74) *Attorney, Agent, or Firm*—Marshall, Gerstein & Borun LLP

(57) ABSTRACT

A wire duct tray having at least two successive segments, with each of the segments including parallel longitudinal wires crossed by transverse wires. The two segments are connected by a fishplate, which may be sheet metal, and which includes a core presenting first and second longitudinal edges. Each of the segments has end transverse wires, and the core bears against the end transverse wire of each segment. Two tabs extend from the first edge of the core and are aligned with one another. Each tab surrounds a longitudinal wire on one of the segments, and may extend around the wire up to 180 degrees.

8 Claims, 2 Drawing Sheets

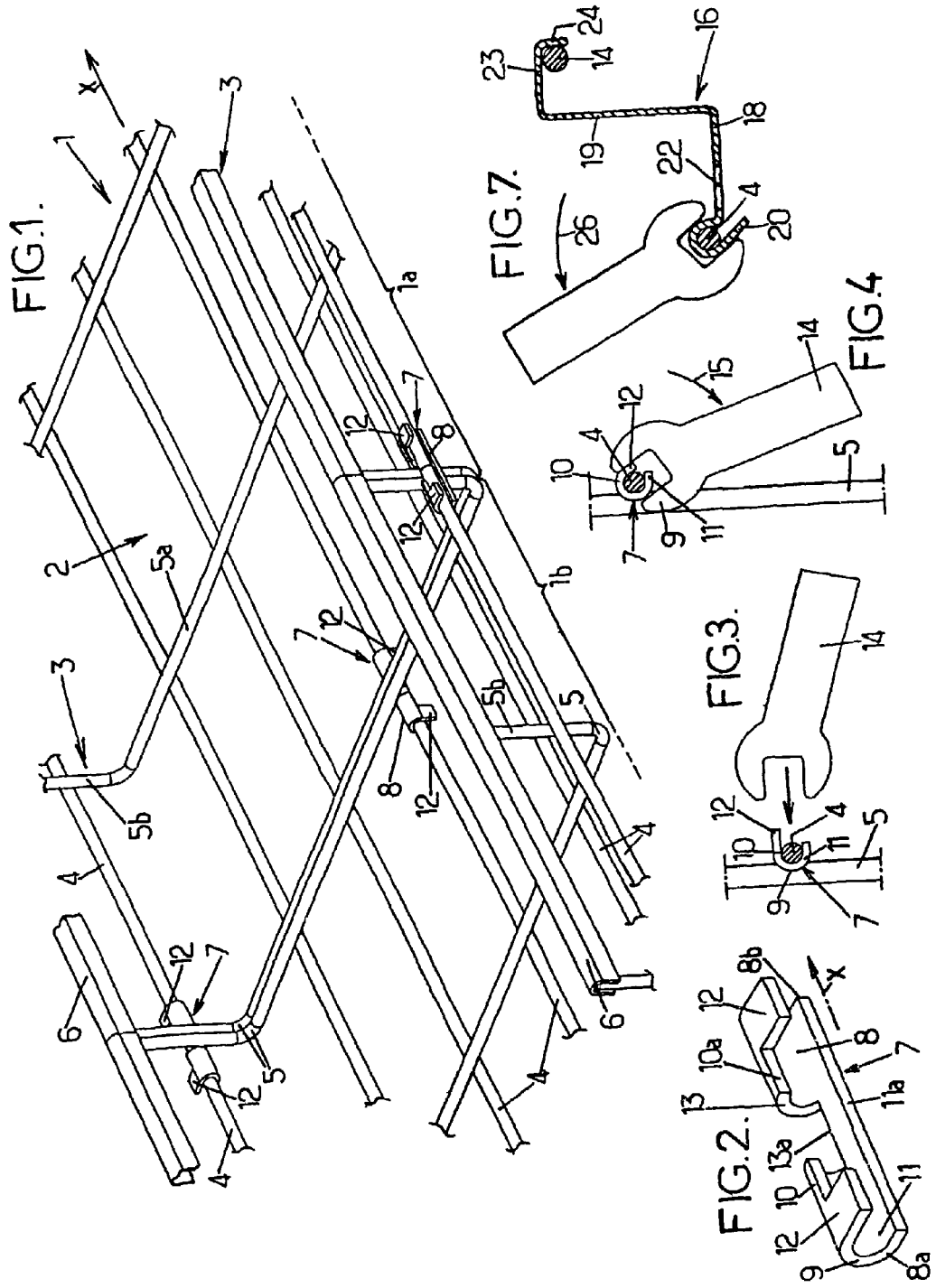

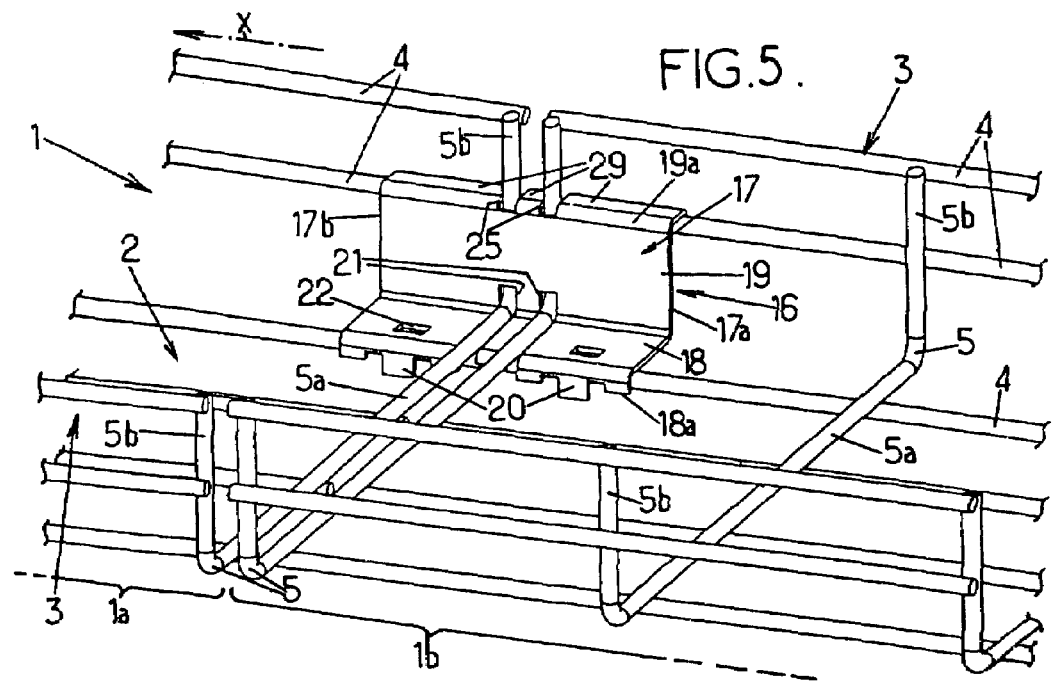
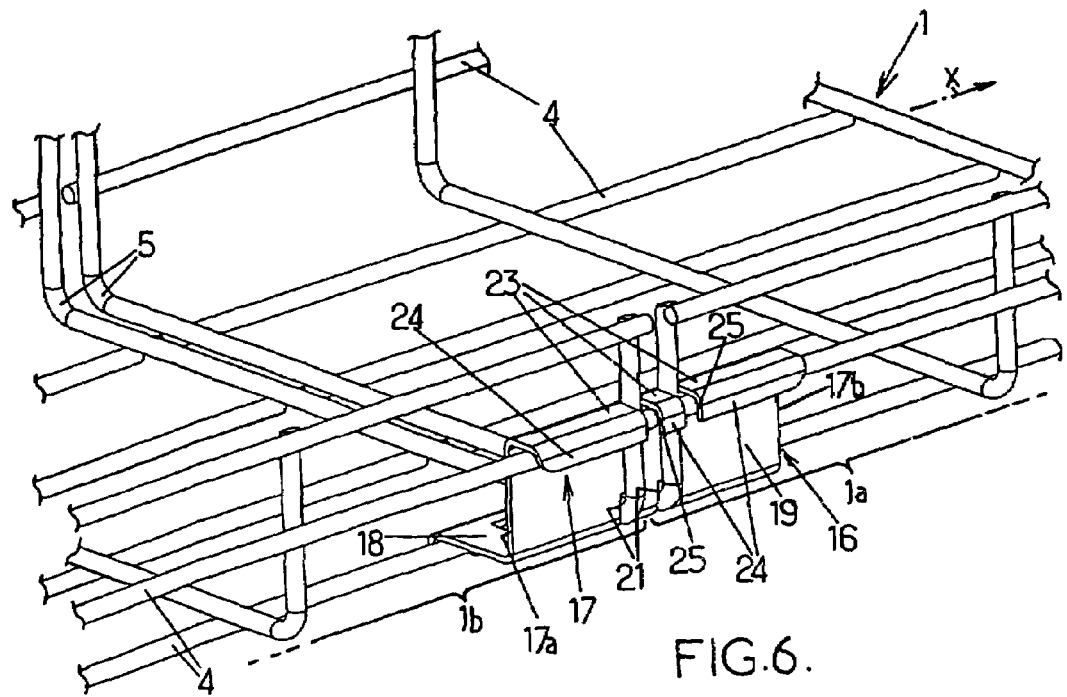

FISHPLATE AND A WIRE DUCT TRAY COMPRISING AT LEAST TWO SEGMENTS INTERCONNECTED BY SUCH A FISHPLATE

FIELD OF THE INVENTION

The present invention relates to coupling members or "fishplates" and to wire duct trays comprising at least two segments interconnected by such a fishplate.

More particularly, the invention relates to a sheet metal fishplate for interconnecting two successive wire duct tray segments (the ducts in question possibly being electric wires, optical fibers, pipes for gas or liquid, etc.), the fishplate comprising at least:

- a core extending in a longitudinal direction between two ends, said core presenting first and second edges parallel to said longitudinal direction; and
- two tabs extending from the core perpendicularly to the longitudinal direction, these two tabs being made integrally with the core.

BACKGROUND OF THE INVENTION

Document EP-A-0 822 364 describes an example of a fishplate of this type in which the two tabs extend in two opposite directions from the core of the fishplate. The two tabs are designed to bear against two longitudinal wires of the same duct tray segment, with the core being secured to two successive duct trays by clipping one of the ends of the core onto one of the duct support segments.

That method of fastening can nevertheless turn out to be not sufficiently strong. In addition, it requires a relative engagement movement in the longitudinal direction between the two successive duct tray segments, which can turn out to be impossible in certain particularly confined environments.

OBJECTS AND SUMMARY OF THE INVENTION

A particular object of the present invention is to mitigate those drawbacks.

To this end, according to the invention, in a fishplate of the kind in question, the two tabs extend in the same direction from the first edge of the core, said tabs being in alignment in the longitudinal direction and each presenting a length of not less than 5 millimeters (mm).

By means of these dispositions, the fishplate can be secured easily and securely to two successive duct tray segments by crimping the two tabs on longitudinal wires of the two segments situated in line with each other. This crimping can be done by engaging a wrench on each tab and turning the wrench, or else by using pliers.

In various embodiments of the fishplate of the invention, recourse may also be had to one or more of the following dispositions:

- the core presents a U-shaped section with a rounded base and two side flanges defining the first and second edges of said core, the two tabs extending away from the base of the U-shape substantially parallel to the side flanges;
- the core presents a notch defining a narrow zone between the two tabs;
- the core presents a generally L-shaped section made up of first and second limbs forming the first and second edges respectively of the core, the second edge being extended by at least two flaps folded away from the first limb substantially at right angles relative to the second limb, each flap itself being extended by a rim substantially parallel to the second limb and extending towards the first limb;
- the flaps define between them at least one slot perpendicular to the longitudinal direction; and
- the first limb of the core presents at least one cutout perpendicular to the longitudinal direction.

The invention also provides a wire duct tray comprising at least two successive segments extending one after another in a general longitudinal direction and each comprising longitudinal wires parallel to the longitudinal direction that are crossed by transverse wires extending across said longitudinal direction, two successive duct support tray segments presenting mutually adjacent ends interconnected by at least one fishplate, the core of the fishplate bearing against two end transverse wires belonging to each of the two successive duct trays, respectively, and the two tabs of the fishplate being crimped respectively about two longitudinal wires that are mutually in line and that belong to the two duct tray segments, respectively.

In various embodiments of the duct tray of the invention, recourse may also be had to one or more of the following dispositions:

- each tab is crimped around the corresponding longitudinal wire by being wound at least in part around said longitudinal wire in an angular direction corresponding to pressing the core against the end transverse wires;
- the core presents a U-shaped section with a rounded base and two side flanges defining the first and second edges of said core, the two tabs extending away from the base of the U-shape substantially parallel to the side flanges;
- the core presents a notch defining a narrow zone between the two tabs, said narrow zone having its edge bearing against the end transverse wires;
- presenting at least one bottom and a side wall, the core of the fishplate presenting a generally L-shaped section comprising first and second limbs respectively forming the first and second edges of the core, the second edge being extended by at least two flaps folded substantially through a right angle relative to the second limb away from the first limb, each flap itself being extended by a rim substantially parallel to the second limb and extending towards the first limb, the first limb bearing against a respective longitudinal wire belonging to the bottom on each of the duct tray segments, with the corresponding tab being crimped thereabout, while the second limb bears against a respective longitudinal wire belonging to the side wall of each duct tray segment, the flap and the corresponding rim being engaged on said longitudinal wire of the side wall;
- the flaps define between them at least one slot extending perpendicularly to the longitudinal direction, and at least one of the end transverse wires is engaged in said slot;
- the flaps define between them two slots extending perpendicularly to the longitudinal direction, and the two end transverse wires are engaged respectively in each of said slots;
- the first limb of the core presents at least one cutout extending perpendicularly to the longitudinal direction, and at least one of the end transverse wires is engaged in said cutout; and
- the first limb of the core presents two cutouts extending perpendicularly to the longitudinal direction, and the two end transverse wires are engaged respectively in said cutouts.

BRIEF DESCRIPTION OF THE DRAWINGS

Other characteristics and advantages of the invention appear from the following detailed description of two embodiments given as non-limiting examples and with reference to the accompanying drawings.

In the drawings:

FIG. 1 is a fragmentary perspective view of a duct tray in a first embodiment of the invention, comprising two wire duct tray segments interconnected by fishplates;

FIG. 2 is a detail view of one of the fishplates of FIG. 1;

FIGS. 3 and 4 show the fishplate of FIG. 2 being crimped;

FIGS. 5 and 6 are fragmentary perspective views of a duct tray in a second embodiment of the invention, showing two wire duct tray segments interconnected by at least one fishplate; and FIG. 7 shows the fishplate of FIGS. 5 and 6 being crimped.

MORE DETAILED DESCRIPTION

In the various figures, the same references designate elements that are identical or similar.

FIG. 1 shows a portion of a wire duct tray 1, in particular a cable tray (the duct tray 1 could be used for supporting electric cables and/or optical fibers and/or other ducts transporting gas or liquids).

The duct tray 1 extends in a longitudinal direction X.

By way of example, the duct tray 1 may be generally in the form of a gutter of generally U-shaped section comprising a bottom 2 and two side walls 3. The duct tray is made of longitudinal metal wires 4 extending in the longitudinal direction X, and transverse metal wires 5 which extend transversely relative to the longitudinal direction X and which are U-shaped, each comprising a base 5a for defining the bottom 2 of the duct tray and two side branches 5b which define the side walls 3 of the duct tray.

At least one longitudinal wire 4 is secured to each side branch 5b of the transverse wires, the other longitudinal wires being secured to the bases 5a of the transverse wires. The free ends of the side branches 5b of the transverse wires may also be covered in a protective metal sheet 6 in the form of an upside-down U-shape.

In the embodiment shown in FIG. 1, the duct tray 1 comprises two successive segments 1a and 1b which are joined end to end in the longitudinal direction X. In the example shown, each duct tray segment 1a, 1b presents, at each of its ends or in the vicinity thereof, a transverse wire 5 referred to as end transverse wire. In the embodiment of FIG. 1, the respective end transverse wires 5 of the segments 1a and 1b are touching each other.

The two successive segments 1a and 1b of the duct tray 1 are secured to each other by means of one or more crimpable fishplates 7 in a first embodiment of the invention, as can clearly be seen in FIGS. 1 and 2 (in FIGS. 1 and 2, these fishplates 7 are shown in the non-crimped position).

Each fishplate 7 comprises a core 8 extending in the longitudinal direction X between two ends 8a and 8b, the core presenting, for example, a section that is substantially U-shaped with a rounded base 9 and two side flanges 10 and 11 defining respective first and second longitudinal edges 10a and 11a.

The first longitudinal edge 10a is extended substantially parallel to the flanges 10, 11 by two tabs 12, e.g. situated at the ends 8a, 8b, each of which tabs extends over a length of more than 5 mm, for example.

The core 8 of the fishplate 7 may also advantageously include a notch 13 extending perpendicularly to the longitudinal direction X from the first edge 10a over a fraction of the length of the first end 10a between the two tabs 12.

As shown in FIGS. 3 and 4, in order to interconnect two duct tray segments 1a and 1b, the core 8 of a fishplate is engaged around the longitudinal wires 4 belonging to each of the two segments 1a and 1b and situated in mutual alignment. The notch 13 is engaged on the two end transverse wires 5 that touch each other at the junction between the segments 1a, 1b, until the edge 13a of the core 8 in the notch 13 comes into abutment against the end transverse wires 5 in question.

Starting from this position (FIGS. 1 and 3), it is possible to crimp the tabs 12 of the fishplate around the longitudinal wires 4, e.g. by means of a wrench 14 or a pair of pliers engaged around the fishplate 7 and in register with each of its tabs 12 in succession. The wrench 14 is turned in the direction of arrow 15 (see FIG. 4) until the tab 12 is wound at least in part around the corresponding longitudinal wire 4. Preferably, the direction of rotation 15 is selected so that the edge 13a of the core 8 comes into abutment against the end transverse wires 5 while the tabs 12 are being crimped.

It should be observed that the fishplate(s) 7 can be secured, by way of example, to the longitudinal wires 4 that are situated in the side walls 3 and/or to the longitudinal wires 4 that are situated in the bottom 2 of the duct tray 1.

In the second embodiment of the invention, as shown in FIGS. 5 and 6, the duct tray 1 is identical or similar to the first embodiment, and is therefore not described again in detail.

The two segments 1a, 1b of this duct tray can be interconnected, e.g. by two fishplates 16, only one of which is shown in FIGS. 5 and 6.

The fishplate 16 is formed by a single piece of sheet metal comprising a core 17 extending in the longitudinal direction X between two ends 17a and 17b.

In the example of FIGS. 5 and 6, the core 17 presents a substantially L-shaped section, presenting first and second limbs 18 and 19.

The fishplate 16 may advantageously be placed inside the duct tray 1 so that the first limb 18 forms a portion of the bottom 2 of the duct tray and the second limb 19 forms a portion of one of the side walls 3 of the duct tray, at the junction between the two segments 1a and 1b.

The first limb 18 of the core 17 of the fishplate presents a first longitudinal edge 18a that can advantageously be folded downwards so as to engage on two longitudinal wires 4 belonging to each of the two segments 1a and 1b respectively, and disposed in mutual alignment, with the first limb 18 resting on these longitudinal wires.

This first longitudinal edge 18a is also extended, e.g. downwards by two tabs 2 adapted to be crimped by being wound at least in part over the two above-mentioned longitudinal wires 4, in a manner described below. By way of example, each of these tabs 20 presents a length that is greater than 5 mm.

Advantageously, the first limb 18 may also present at least one cutout 21 for receiving the end transverse wires 5, this cutout optionally being extended over a fraction of the second limb 19. In the example described, two cutouts 21 are provided so that the two end transverse wires 5 belonging respectively to the segments 1a and 1b do not touch after said segments have been assembled together.

Furthermore, a recess 22 may optionally be provided in the first limb 18 of the core 17 in register with each of the tabs 20 so as to make it easier to crimp said tabs 20, as explained below.

Furthermore, the first limb 19 of the core 17 can bear against two longitudinal wires 4 disposed in mutual alignment, and belonging to the side walls 3 of the segments 1a and 1b respectively.

Advantageously, the second limb 19 is extended horizontally outwards from the duct tray 1 by flaps 23 which present at their free ends respective downwardly-extending vertical rims that can be hooked on the above-mentioned longitudinal wires 4.

These flaps 23 and rims 24 co-operate to define at least one slot 25 adapted to receive the vertical branches of the end longitudinal wires 5 belonging to each of the two segments 1a and 1b, respectively. In the example described, there are two slots 25 so as to receive the end transverse wires 5 in non-touching manner.

The fishplate 16 of FIGS. 5 and 6 is used as follows: after the fishplate 16 has been put into place with its tabs 20 uncrimped, as shown in FIGS. 5 and 6, a wrench 14 or a pair of pliers is engaged on each of the tabs 20 of the fishplate, possibly by causing a portion of the wrench 14 or of the pliers to penetrate into the above-mentioned corresponding recess 22, and the wrench 14 or the pliers is/are turned in angular direction 26 so that each tab 20 is wound at least in part around the corresponding longitudinal wire 4, as shown in FIG. 7. During this movement, the rims 24 co-operate with the corresponding longitudinal wires 4 by hooking against them so as to hold the fishplate 16 in place.

What is claimed is:

1. A wire duct tray comprising at least two successive segments extending one after another in a general longitudinal direction and each comprising longitudinal wires parallel to the longitudinal direction that are crossed by transverse wires extending across said longitudinal direction, the two successive segments presenting mutually adjacent ends interconnected by at least one sheet metal fishplate, the fishplate comprising, a core extending in the longitudinal direction between two lateral portions, said core presenting first and second edges parallel to said longitudinal direction; and two tabs extending respectively from said lateral portions of the core perpendicularly to the longitudinal direction, the two tabs being made integrally with the core;

wherein the two tabs extend in the same direction from the first edge of the core up to a free end, said tabs being in alignment with one another in the longitudinal direction and each presenting a length of not less than 5 mm, and the tabs being shiftable from an uncrimped state in which the tabs cooperate with the base to form a U-shaped cross-section, and a crimped state, the core of the fishplate bearing against two end transverse wires belonging to each of the two successive segments, respectively, and each of the two tabs of the fishplate being shiftable to the crimped state in which the tabs are crimped respectively about a corresponding one of the two longitudinal wires that are mutually in line and that belong to the two duct tray segments, respectively, each of the tabs and the corresponding lateral portion of the core being wrapped around the corresponding longitudinal wire and in contact with more than 180° of the corresponding longitudinal wire when the tabs are shifted to the crimped state, and wherein the free end of each tab is at a first distance from said corresponding longitudinal wire and the second edge of the core is at a second distance from said corresponding longitudinal wire, said first and second distances being measured perpendicularly to corresponding longitudinal wire, said first distance being greater than said second distance when each tab is in the uncrimped state.

2. A duct tray according to claim 1, in which each tab extends around the corresponding longitudinal wire in an angular direction corresponding to a direction in which the core presses against the end transverse wires.

3. A duct tray according to claim 1, in which the core presents a U-shaped section with a rounded base and two side flanges defining the first and second edges of said core, the two tabs extending away from the base of the U-shape substantially parallel to the side flanges.

4. A duct tray according to claim 3, in which the core presents a notch defining a narrow zone between the two tabs, said narrow zone having its edge bearing against the end transverse wires.

5. A wire duct tray comprising:

a first segment and a second segment, each of the first and second segments including longitudinal wires extending parallel to a longitudinal axis of the duct tray, each of the segments including an end having an end wire extending in a transverse direction, the first and second segments arranged to be positioned with the end of the first segment adjacent the end of the second segment and with the longitudinal wires of each segment in line with one another;

a fishplate for joining the segments, the fishplate including a longitudinally extending core having a notch and first and second edges extending parallel to the longitudinal direction;

the fishplate further including a first tab and a second tab, the first and second tabs aligned with one another in the longitudinal direction and extending away from the first edge up to a respective free end;

the notch positioned to receive the end wire of the first segment and the end wire of the second segment; and the first tab and the second tab positioned to be crimped around the corresponding longitudinal wire of the first and second segments respectively, said first and second tabs with the core surrounding and being in contact with more than half of the corresponding longitudinal wire of the first segment and the second segment, respectively, wherein the free end of each tab is at a first distance from said corresponding longitudinal wire and the second edge of the core is at the second distance of said corresponding longitudinal wire, said first and second distances being measured perpendicularly to said corresponding longitudinal wire, and said first distance being greater than said distance at least before crimping of the tab.

6. The duct tray of claim 5, wherein the first and second tabs are arranged symmetrically relative to the notch.

7. The duct tray of claim 6, wherein the fishplate includes a first end and a second end, and wherein the first and second tabs are disposed adjacent the first end and the second end, respectively.

8. A wire duct tray comprising:

a first segment and a second segment, the first segment including a longitudinal wire disposed for alignment with a corresponding longitudinal wire of the second segment, the longitudinal wires extending parallel to a longitudinal axis of the duct tray, each of the segments including an end having an end wire extending in a transverse direction, the first and second segments arranged to be positioned with the end of the first segment adjacent the end of the second segment;

a fishplate for joining the segments and sized to engage the transverse wires and only a single aligned pair of longitudinal wires, the fishplate including a longitudinally extending core having a base, and a first end and a second end spaced apart and separated by only a single notch, the notch positioned to receive the end wire of the first segment and the end wire of the second segment, the fishplate further including a first flange terminating in a first edge and a second flange terminating in a second edge, each of the first and second edges extending parallel to the longitudinal direction, the first flange and the second flange cooperating with the base to engage a portion of the longitudinal wires of the first segment and the second segment;

a first tab and a second tab formed on opposite sides of the notch and adjacent the first end and the second end, respectively, the first and second tabs aligned with one another in the longitudinal direction and sized to extend away from the first edge and to extend beyond the second edge;

the first and second tabs sized to cooperate with the base, the first flange and the second flange to surround and contact more than half of a circumference of the corresponding longitudinal wires of the first and second segments, respectively, when the first and second tabs are shifted to a crimped state.

* * * * *